US011339780B2

(12) United States Patent
Kataoka et al.

(10) Patent No.: US 11,339,780 B2
(45) Date of Patent: May 24, 2022

(54) ELECTRIC OIL PUMP

(71) Applicant: Nidec Tosok Corporation, Zama (JP)

(72) Inventors: Shigehiro Kataoka, Zama (JP); Yoshiyuki Kobayashi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 303 days.

(21) Appl. No.: 16/633,602

(22) PCT Filed: Aug. 16, 2018

(86) PCT No.: PCT/JP2018/030386
§ 371 (c)(1),
(2) Date: Jan. 24, 2020

(87) PCT Pub. No.: WO2019/044513
PCT Pub. Date: Mar. 7, 2019

(65) Prior Publication Data
US 2020/0232477 A1 Jul. 23, 2020

(30) Foreign Application Priority Data
Aug. 31, 2017 (JP) .............................. JP2017-167872

(51) Int. Cl.
F04D 29/52 (2006.01)
F04D 13/06 (2006.01)
(Continued)

(52) U.S. Cl.
CPC .............. F04C 2/08 (2013.01); F04C 2/102 (2013.01); H02K 3/522 (2013.01); H02K 7/14 (2013.01);
(Continued)

(58) Field of Classification Search
CPC ...... H02K 7/14; H02K 11/33; H02K 2211/03; H02K 5/24; H02K 1/185; H02K 2203/06;
(Continued)

(56) References Cited

U.S. PATENT DOCUMENTS 9,175,680 B2* 11/2015 Miyaki ................. F04C 11/008
9,422,939 B2* 8/2016 Kanda .................... H02K 15/16
(Continued)

FOREIGN PATENT DOCUMENTS

| JP | 2012-092742 A | 5/2012 |
| JP | 2012-110165 A | 6/2012 |
| JP | 2013-092126 A | 5/2013 |

OTHER PUBLICATIONS

Official Communication issued in International Patent Application No. PCT/JP2018/030386, dated Nov. 20, 2018.

Primary Examiner — Dominick L Plakkoottam
(74) Attorney, Agent, or Firm — Keating & Bennett

(57) ABSTRACT

An electric oil pump includes a motor including a shaft, a pump driven with the shaft therebetween, and an inverter fixed to a rear side of the motor. The motor includes a motor housing. The inverter includes an inverter housing including a circuit board accommodation portion. The inverter housing includes bus bars that connect coil ends inside the circuit board accommodation portion and extending from the motor and a circuit board to each other. The motor housing includes a bottomed cylindrical shape including a bottom portion on the inverter side. The inverter housing includes a fixed portion that is fixed to the bottom portion. The fixed portion is fixed to the bottom portion using fixing members, and the fixing members are disposed within a region surrounded by bus bars.

10 Claims, 4 Drawing Sheets

(51) Int. Cl.
| | |
|---|---|
| *F04D 29/18* | (2006.01) |
| *F04D 29/043* | (2006.01) |
| *H02K 3/52* | (2006.01) |
| *H02K 7/14* | (2006.01) |
| *H02K 11/33* | (2016.01) |
| *H02K 21/16* | (2006.01) |
| *F04C 2/08* | (2006.01) |
| *F04C 2/10* | (2006.01) |

(52) U.S. Cl.
CPC ............ *H02K 11/33* (2016.01); *H02K 21/16* (2013.01); *F04C 2240/30* (2013.01); *F04C 2240/803* (2013.01); *F04C 2240/808* (2013.01); *F04D 13/06* (2013.01); *F04D 29/043* (2013.01); *F04D 29/181* (2013.01); *F04D 29/528* (2013.01); *H02K 2203/09* (2013.01); *H02K 2211/03* (2013.01)

(58) Field of Classification Search
CPC ...... H02K 2203/09; H02K 5/225; F04C 2/08; F04C 2240/30; F04C 2240/805; F04C 2240/808; F04C 2240/40; F04C 11/008; F04C 2210/206; F04C 2240/10; F04C 2240/20; F04C 2240/403; H02M 7/003
See application file for complete search history.

(56) References Cited

U.S. PATENT DOCUMENTS

| | | | | |
|---|---|---|---|---|
| 9,982,922 | B2* | 5/2018 | Sakai | F04B 17/03 |
| 10,020,707 | B2* | 7/2018 | Suzuki | H02K 11/33 |
| 10,454,338 | B2* | 10/2019 | Jung | H02K 11/33 |
| 2014/0306563 | A1* | 10/2014 | Oyama | H02K 11/02 |
| | | | | 310/71 |

* cited by examiner

ELECTRIC OIL PUMP

CROSS REFERENCE TO RELATED APPLICATIONS

This is a U.S. national stage of PCT Application No. PCT/JP2018/030386, filed on Aug. 16, 2018, and priority under 35 U.S.C. § 119(a) and 35 U.S.C. § 365(b) is claimed from Japanese Application No. 2017-167872, filed Aug. 31, 2017; the entire disclosures of each application being hereby incorporated herein by reference.

1. FIELD OF THE INVENTION

The present disclosure relates to an electric oil pump.

2. BACKGROUND

For example, Japanese Unexamined Patent Application Publication No. 2013-092126 discloses an electric oil pump in which an inverter unit having a circuit board and an electric pump are integrated. This electric oil pump has an oil pump unit and the inverter unit. The oil pump unit of the electric oil pump is inserted into a pump accommodation hole. The inverter unit is disposed on a motor unit side of the oil pump unit and extends in a direction along an outer surface of a housing of a transmission. The oil pump unit and the inverter unit are fixed to the housing of the transmission with bolts therebetween.

Japanese Unexamined Patent Application Publication No. 2013-092126 discloses a case where an electric oil pump is fixed to the inside of a transmission. However, there are cases where an electric oil pump is fixed to the outside of a transmission. When an electric oil pump is fixed to the outside of a transmission, an inverter unit is in a cantilever supporting state with respect to a fixing position of the electric oil pump to the transmission. Therefore, when vibration generated in an engine or the like is propagated to the electric oil pump via the transmission, there is a risk that the inverter unit at a position spaced away from the fixing position may vibrate significantly due to the vibration propagated to the electric oil pump. Accordingly, there is a risk that a rib of an electronic component mounted on a circuit board (for example, a capacitor) may be disconnected.

SUMMARY

An example embodiment of the present disclosure provides an electric oil pump capable of curbing a risk that an electronic component mounted on a circuit board inside an inverter may be damaged due to vibration, when an electric oil pump including an inverter is fixed.

According to an example embodiment of the present disclosure, an electric oil pump includes a motor including a shaft about a central axis extending in an axial direction, a pump on one side in an axial direction from the motor, is driven by the motor with the shaft therebetween to discharge oil, and an inverter on the other side of the motor in the axial direction and is fixed to the motor. The motor includes a rotor fixed to the other side of the shaft in the axial direction, a stator on a side outward in a radial direction from the rotor, and a motor housing that accommodates the rotor and the stator. The pump includes a pump rotor attached to the shaft protruding from the motor to one side in the axial direction, and a pump housing including an accommodation portion accommodating the pump rotor. The inverter includes an inverter housing including a circuit board accommodation portion accommodating a circuit board. The inverter housing includes a plurality of bus bars that electrically connect coil ends disposed inside the circuit board accommodation portion and extending from the motor and the circuit board to each other. The motor housing includes a bottomed cylindrical shape including a bottom portion on the inverter side. An end portion of the inverter housing on the motor side includes a fixed portion fixed to the bottom portion of the motor housing. The fixed portion is fixed to the bottom portion of the motor housing with fixing members therebetween. The fixing members are disposed within a region surrounded by the plurality of bus bars.

According to an example embodiment of the present disclosure, it is possible to curb a risk that an electronic component mounted on a circuit board inside an inverter may be damaged due to vibration, when an electric oil pump including an inverter is fixed. In addition, bus bars and fixing members are able to be disposed compactly, and miniaturization of the inverter is realized.

The above and other elements, features, steps, characteristics and advantages of the present disclosure will become more apparent from the following detailed description of the example embodiments with reference to the attached drawings.

DETAILED DESCRIPTION

Figure 1:
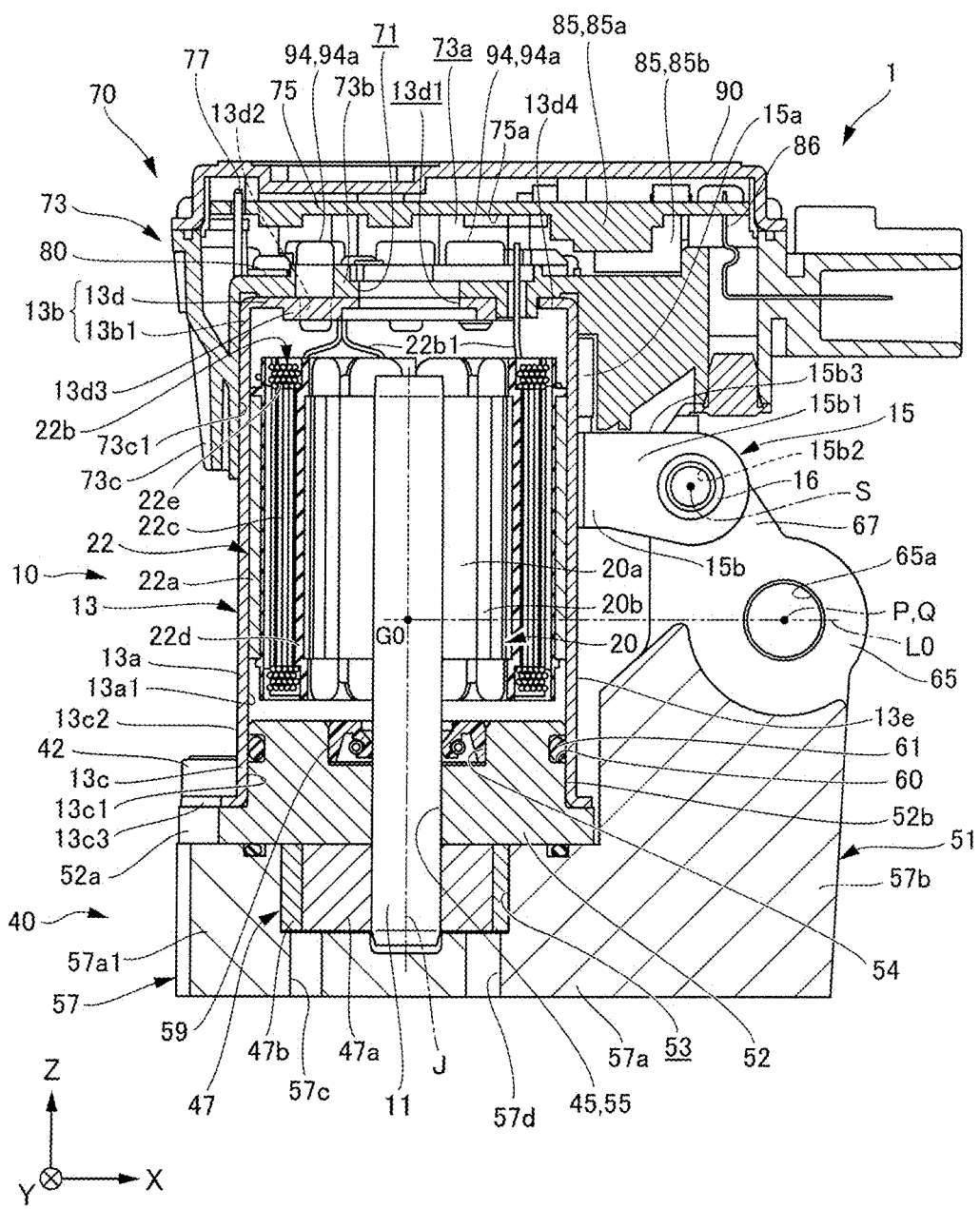
FIG. 1 is a cross-sectional view of an electric oil pump according to a first example embodiment of the present disclosure.

Hereinafter, with reference to the drawings, electric oil pumps according to example embodiments of the present disclosure will be described. In addition, in the following drawings, in order to make each structure or configuration easy to understand, there are cases where actual structures may differ from respective structures in scale, number, and the like.

In addition, in the drawings, an XYZ coordinate system is suitably indicated as a three-dimensional orthogonal coordinate system. In the XYZ coordinate system, a Z axis direction is a direction parallel to an axial direction of a central axis J illustrated in FIG. 1. An X axis direction is a direction parallel to a width direction of the electric oil pump illustrated in FIG. 1, that is, a transverse direction in FIG. 1. A Y axis direction is a direction orthogonal to both the X axis direction and the Z axis direction.

In addition, in the following description, a positive side (positive Z side) in the Z axis direction will be described as "a rear side", and a negative side (negative Z side) in the Z axis direction will be described as "a front side". The rear side and the front side are simply names used for description and do not limit actual positional relationships or directions. In addition, unless otherwise specified, a direction (Z axis direction) parallel to the central axis J will be simply described as "an axial direction", a radial direction about the central axis J will be simply described as "a radial direction", and a circumferential direction about the central axis J, that is, a direction (θ direction) around the central axis J will be simply described as "a circumferential direction".

In this specification, a state of extending in the axial direction includes a case of extending in a direction inclined within a range of less than 45° with respect to the axial direction, in addition to a case of strictly extending in the axial direction (Z axis direction). In addition, in this specification, a state of extending in the radial direction includes a case of extending in a direction inclined within a range of less than 45° with respect to the radial direction, in addition to a case of strictly extending in the radial direction, that is, a direction perpendicular to the axial direction (Z axis direction).

First Example Embodiment

<Overall Constitution>

FIG. 1 is a cross-sectional view of an electric oil pump according to a first example embodiment. As illustrated in FIG. 1, an electric oil pump 1 of the present example embodiment has a motor unit 10 and a pump unit 40. The motor unit 10 and the pump unit 40 are disposed in the axial direction. The motor unit 10 has a shaft 11 disposed along the central axis J extending in the axial direction. The pump unit 40 is positioned on one side (a side in front) of the motor unit 10 in the axial direction, is driven by the motor unit 10 with the shaft 11 therebetween, and discharges oil. Hereinafter, each of the constituent members will be described in detail.

<Motor Unit 10>

As illustrated in FIG. 1, the motor unit 10 has a motor housing 13, a rotor 20, the shaft 11, a stator 22, and an inverter unit 70.

For example, the motor unit 10 is an inner rotor-type motor, in which the rotor 20 is fixed to an outer circumferential surface of the shaft 11 and the stator 22 is positioned on a side outward in the radial direction from the rotor 20.

(Motor Housing 13)

As illustrated in FIG. 1, the motor housing 13 has a stator holding unit 13a, an inverter holding unit 13b, a pump body holding unit 13c, and a motor fixing portion 15. The motor housing is made of a metal. The motor housing 13 has a bottomed cylindrical shape having a bottom portion 13d on the inverter unit 70 side.

(Stator Holding Unit 13a)

The stator holding unit 13a extends in the axial direction and internally has a penetration hole 13a1. The shaft 11, the rotor 20, and the stator 22 of the motor unit 10 are disposed inside the penetration hole 13a1. An outer surface of the stator 22, that is, an outer surface of a core back portion 22a (which will be described below) is fitted to an inner surface of the stator holding unit 13a. Accordingly, the stator 22 is accommodated in the stator holding unit 13a.

(Inverter Holding Unit 13b)

The inverter holding unit 13b is a part leading to a rear side end portion of the stator holding unit 13a. In the present example embodiment, the inverter holding unit 13b has a rear side end portion 13b1 of the stator holding unit 13a, and the disk-shaped bottom portion 13d extending inward in the radial direction from the rear side end portion 13b1. A motor unit-side penetration hole 13d1 penetrating the bottom portion 13d in the axial direction is provided in a central portion of the bottom portion 13d. This motor unit-side penetration hole 13d1 communicates with an inverter unit-side penetration hole 71 provided in the inverter unit 70, so that the inside of the motor unit 10 and the inside of the inverter unit 70 communicate with each other. Details of the motor unit-side penetration hole 13d1 and the inverter unit-side penetration hole 71 will be described below.

The bottom portion 13d has a plurality of screw holes 13d2 penetrating the bottom portion 13d in the axial direction at intervals in the circumferential direction on the side outward in the radial direction from the motor unit-side penetration hole 13d1. In the present example embodiment, the thicknesses (wall thicknesses) of screw hole portions 13d3 in the axial direction in the screw holes 13d2 provided in the bottom portion 13d are thicker than the thickness of an outward part 13d4 of the bottom portion 13d in the radial direction. Here, in order to ensure the minimum necessary lengths for the screw holes 13d2 in the axial direction, the screw hole portions 13d3 are thickened in the axial direction. The screw hole portions 13d3 may be obtained by performing burring of a metal plate, in which tubular flange portions protruding to one side in the axial direction are formed and female screw portions are provided on inner surfaces of the flange portions.

(Pump Body Holding Unit 13c)

The pump body holding unit 13c has a tubular shape having an open front side and continuously leads to a front side end of the stator holding unit 13a. The pump body holding unit 13c internally has a hole portion 13c1 extending in the axial direction. The inner diameter of the hole portion 13c1 has slightly larger dimensions than the outer diameter of a pump body 52 of the pump unit 40 (which will be described below) on the rear side. The rear side of the pump body 52 is fitted to an inner surface of the hole portion 13c1.

The outer surface 13c2 of the pump body holding unit 13c has a motor-side flange portion 13c3 protruding in the radial direction. The motor-side flange portion 13c3 is disposed facing pump-side flange portions 52a provided in the pump body 52 (which will be described below) and is fixed to the pump-side flange portions 52a using a fastening means such as a bolt 42. Accordingly, the pump unit 40 is fixed to the motor housing 13.

(Motor Fixing Portion 15)

As illustrated in FIG. 1, the motor fixing portion 15 is fixed to the pump unit 40. The motor fixing portion 15 has a fixing surface portion 15a disposed facing an outer surface 13e of the motor housing 13, and a protrusion portion 15b protruding from the fixing surface portion 15a. The fixing surface portion 15a has a plate shape curved along the outer surface 13e of the motor housing 13. An outer circumferential edge of the fixing surface portion 15a is fixed through welding. The fixing surface portion 15a is not limited to the case of being fixed to the outer surface 13e of the motor housing 13 through welding. The fixing surface portion 15a may be fixed to the outer surface 13e of the motor housing 13 using a fastening means such as a bolt.

The protrusion portion 15b protrudes outward in the radial direction from an end portion of the fixing surface portion 15a on one side in the circumferential direction. In the present example embodiment, the protrusion portion 15b has a plate shape having a pair of flat surface-shaped side surfaces 15b1 on both sides in the circumferential direction. A hole portion 15b2 is provided in a tip side of the protrusion portion 15b in a protruding direction. A bolt 16 penetrates this hole portion 15b2 and is fixed to a pump fixing portion 65 provided in the pump unit 40. Details of the pump fixing portion 65 will be described below.

The motor fixing portion 15 is positioned on the side outward from a side surface of the motor housing 13 and is disposed on the inverter unit 70 side. Moreover, the motor fixing portion 15 is disposed on the motor housing 13 side of a fixing position Q where the pump fixing portion 65 is fixed and on the inverter unit 70 side. In the present example embodiment, a center P of a fixing hole portion 65a of the pump fixing portion 65 is disposed on a virtual line L0 passing through a centroid G0 of the electric oil pump 1 and extending in a direction orthogonal to the axial direction, and a position of a center S of the hole portion 15b2 of the protrusion portion 15b of the motor fixing portion 15 is disposed on the motor housing 13 side of the center P of the fixing hole portion 65a of the pump fixing portion 65 and on the inverter unit 70 side. Thus, the motor fixing portion 15 can be fixed to the pump fixing portion 65 in a state of being closer to the inverter unit 70 side. In addition, since the pump fixing portion is positioned on the virtual line L0 passing through the centroid G0 of the electric oil pump 1, it is possible to curb increase in vibration, such as propagation of vibration which has been transferred to the pump fixing portion 65 to the electric oil pump 1.

(Rotor 20)

The rotor 20 has a rotor core 20a and a rotor magnet 20b. The rotor core 20a surrounds the shaft 11 in a direction (θ direction) around the axis and is fixed to the shaft 11. The rotor magnet 20b is fixed to an outer surface in a direction (θ direction) around the axis of the rotor core 20a. The rotor core 20a and the rotor magnet 20b rotate together with the shaft 11. The rotor 20 may be a magnet-embedded type in which a permanent magnet is embedded inside the rotor 20. In a magnet-embedded type rotor 20, compared to a surface magnet type in which a permanent magnet is provided on an outer surface of the rotor 20, a risk that a magnet may fall off due to a centrifugal force can be reduced, and a reluctance torque can be utilized actively.

(Stator 22)

The stator 22 surrounds the rotor 20 in a direction (θ direction) around the axis and rotates the rotor 20 around the central axis J. The stator 22 has the core back portion 22a, teeth portions 22c, a coil 22b, and insulators (bobbins) 22d.

The shape of the core back portion 22a is a cylindrical shape concentric with the shaft 11. The teeth portions 22c extend from the inner surface of the core back portion 22a toward the shaft 11. A plurality of teeth portions 22c are provided and are disposed at equal intervals in the circumferential direction on the inner surface of the core back portion 22a. The coil 22b is provided around the insulators (bobbins) 22d and is constituted of a wound conductive wire 22e. The insulators (bobbins) 22d are mounted in the respective teeth portions 22c.

(Shaft 11)

As illustrated in FIG. 1, the shaft 11 extends along the central axis J and penetrates the motor unit 10. The front side (negative Z side) of the shaft 11 protrudes from the motor unit 10 and extends into the pump unit 40. The rear side (positive Z side) of the shaft 11 protrudes from the rotor 20 and becomes a free end. Therefore, the rotor 20 is in a cantilever supporting state in which the front side of the shaft 11 is supported by a slide bearing 45 (which will be described below).

(Inverter Unit 70)

The inverter unit 70 has a bottomed container-shaped inverter housing 73 having a circuit board accommodation portion 73a which opens on the rear side and is depressed on the front side and extending in the X axis direction, and a cover portion 90.

In the circuit board accommodation portion 73a, the opening of the circuit board accommodation portion 73a on the rear side is covered by the cover portion 90. A circuit board 75, connector-side terminals 77, bus bars 80 (refer to FIG. 2), a terminal portion 86, and the like are accommodated inside the circuit board accommodation portion 73a.

The connector-side terminals 77 are disposed on the left side in the X axis direction inside the circuit board accommodation portion 73a. One end sides thereof are electrically connected to coil ends 22b1 of the motor unit 10 with the respective bus bars 80 therebetween, and the other end sides thereof are electrically connected to the circuit board 75. The terminal portion 86 is disposed on the right side in the X axis direction inside the circuit board accommodation portion 73a. One end side thereof is electrically connected to an external connector (not illustrated), and the other end side thereof is electrically connected to the circuit board 75.

The circuit board 75 outputs a motor output signal. The circuit board 75 is disposed on the rear side of the circuit board accommodation portion 73a and extends in a direction intersecting the axial direction. In the present example embodiment, the circuit board 75 extends in the X axis direction orthogonal to the axial direction. A printed wiring (not illustrated) is provided on a front side surface 75a of the circuit board 75. In addition, a plurality of electronic components 85 are mounted on the front side surface 75a of the circuit board 75. In the illustrated example embodiment, the electronic components 85 (for example, a capacitor 85a and a choke coil 85b) of which lead wires are electrically connected to the circuit board 75 are mounted. In addition, when a copper inlay substrate is used as the circuit board 75, heat generated in a heating element (not illustrated) can dissipate via the cover portion.

As illustrated in FIG. 1, the front side of the inverter housing 73 has a fixed portion 73b fixed to the bottom portion 13d of the motor housing 13. In the present example embodiment, the fixed portion 73b has a disk shape about the central axis J when viewed in the axial direction and is fastened and fixed to the bottom portion 13d with fixing members 94 such as a plurality of bolts 94a therebetween in a state of being placed on the bottom portion 13d of the motor housing 13. The fixed portion 73b is disposed on a side inward in the radial direction from the bottom portion 13d. Details of the fixed portion 73b will be described below.

Figure 2:
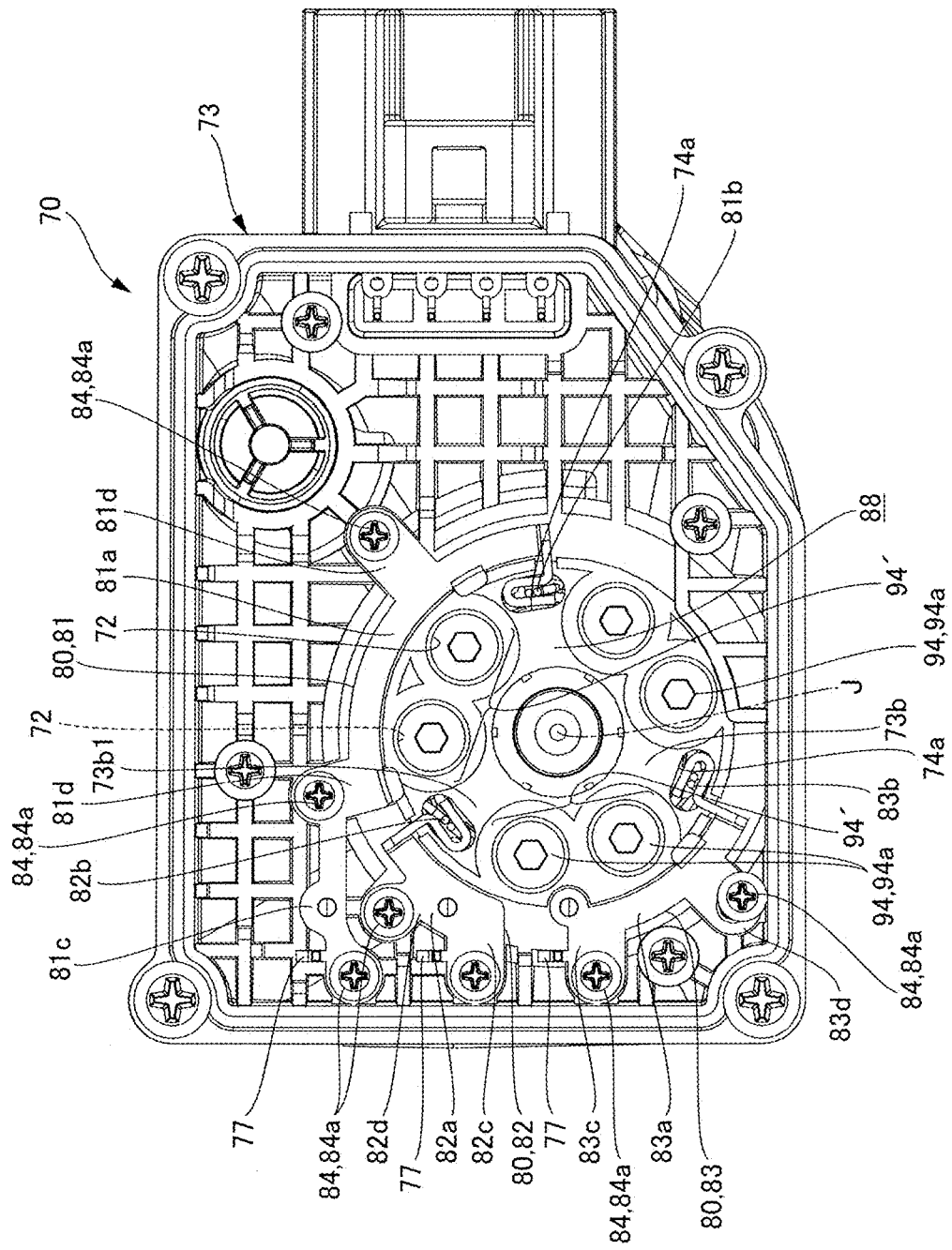
FIG. 2 is a plan view of an inverter unit having bus bars according to the first example embodiment of the present disclosure.

FIG. 2 is a plan view of the inverter unit 70 having the bus bars 80 according to the first example embodiment. As illustrated in FIG. 2, a plurality of bus bars 80 are disposed on a surface 73b1 of the fixed portion 73b on the rear side. In the present example embodiment, three bus bars 80 are disposed on a circumferential edge portion of the fixed portion 73b at intervals in the circumferential direction. In the present example embodiment, the bus bars 80 includes a first bus bar 81, a second bus bar 82, and a third bus bar 83.

The first bus bar 81 has a plate shape and is disposed on the positive side in the Y axis direction on the surface 73b1 of the fixed portion 73b on the rear side. The first bus bar 81 has a first bus bar main body portion 81a curved in the circumferential direction. The first bus bar main body portion 81a is curved with a predetermined width in the radial direction about the central axis J. One end side of the first bus bar main body portion 81a has a coil end connection portion 81b which is bent and extends to the rear side. In addition, the other end side of the first bus bar main body portion 81a has a connector-side terminal coupling portion 81c extending to the left side in the X axis direction. The connector-side terminal 77 which is bent and extends to the rear side is provided on a tip side of the connector-side terminal coupling portion 81c in an extending direction. In addition, a plurality of protrusion portions 81d protruding outward in the radial direction are provided in the first bus bar main body portion 81a. Tip portions of the protrusion portions 81d and the connector-side terminal coupling portion 81c in the extending direction are fastened and fixed to the fixed portion 73b with fixing members 84 such as bolts 84a therebetween.

The second bus bar 82 has a plate shape and is disposed with a gap therebetween on the left side of the first bus bar 81 in the X axis direction. The second bus bar 82 has a second bus bar main body portion 82a curved in the circumferential direction. The length of the second bus bar main body portion 82a in the circumferential direction is shorter than the length of the first bus bar main body portion 81a in the circumferential direction. Similar to the first bus bar main body portion 81a, the second bus bar main body portion 82a is curved with a predetermined width in the radial direction about the central axis J. A coil end connection portion 82b which is bent and extends to the rear side is provided on one end side of the second bus bar main body portion 82a. In addition, a connector-side terminal coupling portion 82c extending to the left side in the X axis direction is provided on the other end side of the second bus bar main body portion 82a. The connector-side terminal 77 which is bent and extends to the rear side is provided in an intermediate portion of the connector-side terminal coupling portion 82c. In addition, a protrusion portion 82d protruding outward in the radial direction is provided in the second bus bar main body portion 82a. In tip portions of the protrusion portion 82d and the connector-side terminal coupling portion 82c, the second bus bar 82 is fastened and fixed to the fixed portion 73b with the fixing members 84 such as the bolts 84a therebetween.

The third bus bar 83 has a plate shape and is disposed with a gap therebetween on the negative side of the second bus bar 82 in the Y axis direction. The third bus bar 83 has a third bus bar main body portion 83a curved in the circumferential direction. The length of the third bus bar main body portion 83a in the circumferential direction is longer than the length of the second bus bar main body portion 82a in the circumferential direction. Similar to the first bus bar main body portion 81a and the second bus bar main body portion 82a, the third bus bar main body portion 83a is curved with a predetermined width in the radial direction about the central axis J. A coil end connection portion 83b which is bent and extends to the rear side is provided on one end side of the third bus bar main body portion 83a. In addition, a connector-side terminal coupling portion 83c extending to the left side in the X axis direction is provided on the other end side of the third bus bar main body portion 83a. The connector-side terminal 77 which is bent and extends to the rear side is provided in an intermediate portion of the connector-side terminal coupling portion 83c. In addition, a protrusion portion 83d protruding outward in the radial direction is provided in the third bus bar main body portion 83a. Tip portions of the protrusion portion 83d and the connector-side terminal coupling portion 83c are fastened and fixed to the fixed portion 73b with the fixing members 84 such as the bolts 84a therebetween.

End portions of the first bus bar main body portion 81a, the second bus bar main body portion 82a, and the third bus bar main body portion 83a on the side inward in the radial direction are positioned on the same radius about the central axis J. Therefore, the side inward in the radial direction from the first bus bar main body portion 81a, the second bus bar main body portion 82a, and the third bus bar main body portion 83a has a circular region 88. That is, the circular region 88 is a region surrounded by the first bus bar main body portion 81a, the second bus bar main body portion 82a, and the third bus bar main body portion 83a. Since the protrusion portions 81d, 82d, and 83d fixing the respective first bus bar main body portion 81a, the second bus bar main body portion 82a, and the third bus bar main body portion 83a to the inverter unit 70 protrude outward in the radial direction with respect to the respective bus bar main body portions, the circular region 88 is not narrowed.

Figure 3:
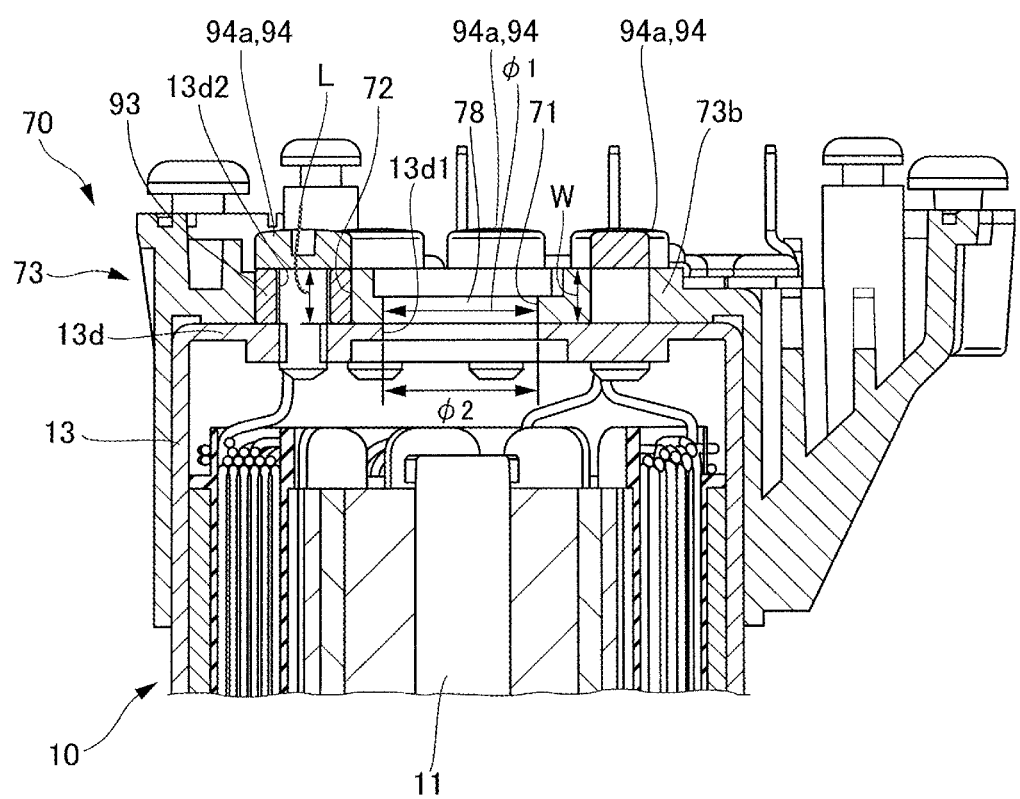
FIG. 3 is a cross-sectional view of the inverter unit according to the first example embodiment of the present disclosure.

FIG. 3 is a cross-sectional view of the inverter unit 70 according to the first example embodiment. As illustrated in FIGS. 2 and 3, a plurality of first penetration holes 72 penetrating the fixed portion 73b in the axial direction are provided in the circumferential edge portion of the fixed portion 73b at intervals in the circumferential direction. In the present example embodiment, six first penetration holes 72 are provided in pairs in the circumferential direction. In the six first penetration holes 72, two first penetration holes 72 adjacent to each other in the circumferential direction make a pair, so that three pairs of first penetration holes 72 are disposed at equal intervals in the circumferential direction. These first penetration holes 72 are disposed facing the screw holes 13d2 provided in the bottom portion 13d of the motor housing. Metal collars 93 are inserted into the first penetration holes 72. Fixing members 94 such as the bolts 94a are inserted into the collars 93. When the fixing members 94 are screwed into the screw holes 13d2, the fixed portion 73b is firmly fixed to the bottom portion 13d of the motor housing 13. The coil end connection portions 81b, 82b, and 83b are disposed between the pairs of first penetration holes 72.

Lengths L of the collars 93 in the axial direction are larger than a thickness W of the fixed portion 73b of the inverter housing 73 in the axial direction. In the present example embodiment, the lengths L of the collars 93 in the axial direction are slightly larger than the thickness W of the fixed portion 73b in the axial direction. Therefore, at the time of fastening using the fixing members 94, it is possible to curb a risk that the resin fixed portion 73b may be damaged.

As illustrated in FIG. 1, the inverter housing 73 has a wall portion 73c extending from the circumferential edge portion of the fixed portion 73b to the front side. A fitting hole portion 73c1 for fitting the rear side of the motor housing 13 is provided on an inward side of the wall portion 73c. Therefore, when the fixed portion 73b is fixed to the bottom portion 13d of the motor housing 13 in a state where the rear side of the motor housing 13 is fitted into the fitting hole portion 73c1, the inverter unit 70 can be fixed to the motor housing 13 in a state where the inverter unit 70 maintains a predetermined posture with respect to the motor housing 13.

Figure 4:
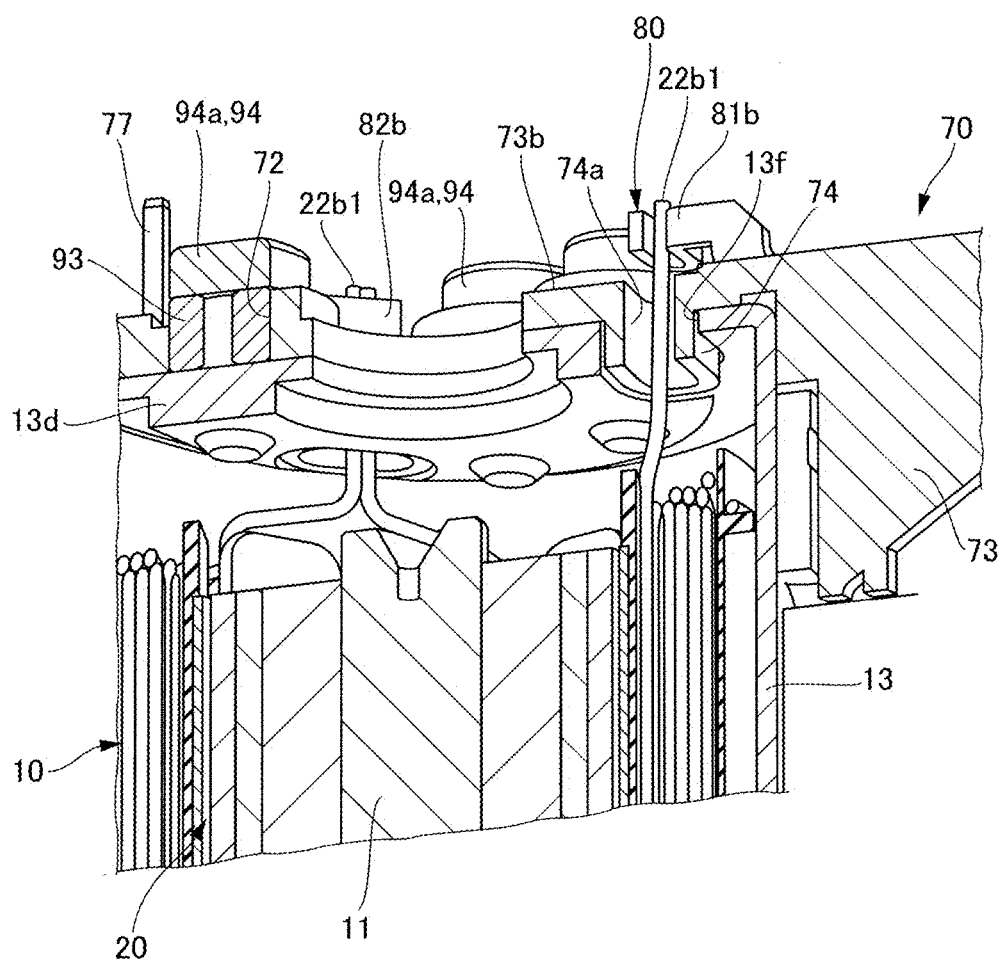
FIG. 4 is a partial cross-sectional view of the inverter unit in which a protrusion portion penetrated by a coil end is viewed from a side obliquely in front according to the first example embodiment of the present disclosure.

FIG. 4 is a partial cross-sectional view of the inverter unit 70 in which a protrusion portion 74 penetrated by the coil end 22b1 is viewed from a side obliquely in front according to the first example embodiment. As illustrated in FIGS. 1 and 4, the protrusion portion 74 protruding to the front side is provided in the fixed portion 73b between the pair of first penetration holes 72 adjacent to each other in the circumferential direction. The protrusion portion 74 has a second penetration hole 74a penetrating the protrusion portion 74 in the axial direction. In the present example embodiment, the second penetration hole 74a has an elongated circular shape when viewed in the axial direction. The motor housing 13 has an insertion hole 13f into which the protrusion portion 74 is inserted in the bottom portion 13d. A front side end portion of the protrusion portion 74 protrudes from an opening portion of the insertion hole 13f on one side in the axial direction in a state where the protrusion portion 74 is inserted into the insertion hole 13f. The coil end 22b1 extending from the motor unit 10 is inserted into the second penetration hole 74a, and the coil end 22b1 passes through the second penetration hole 74a and is connected to the coil end connection portion 81b of the bus bar 80 disposed inside the inverter unit 70.

As illustrated in FIG. 2, the fixing members 94 and the second penetration holes 74a are disposed alternately in the circumferential direction with respect to the fixed portion 73b of the inverter housing 73. In the present example embodiment, pairs of fixing members 94' and the second penetration holes 74a adjacent to each other in the circumferential direction are disposed alternately in the circumferential direction in the fixed portion 73b. In the present example embodiment, a case of a three-phase motor unit 10 has been described as an example. However, in a case of a four-phase or five-phase motor unit, the fixing members 94 and the second penetration holes 74a may be disposed alternately in the circumferential direction in the fixed portion 73b.

As illustrated in FIG. 3, a third penetration hole 78 penetrating the fixed portion 73b and the bottom portion 13d throughout the entireties thereof is provided in the fixed portion 73b of the inverter housing 73 and the bottom portion 13d of the motor housing 13. The third penetration hole 78 is disposed on the side inward in the radial direction from the fixing members 94 and the second penetration holes 74a disposed in the circumferential direction. In the present example embodiment, the third penetration hole 78 is provided coaxially with the central axis J. The third penetration hole 78 has the inverter unit-side penetration hole 71 provided in the fixed portion 73b and the motor unit-side penetration hole 13d1 provided in the bottom portion 13d. An inner diameter $\phi 1$ of the inverter unit-side penetration hole 71 is smaller than an inner diameter $\phi 2$ of the motor unit-side penetration hole 13d1. That is, $\phi 1 < \phi 2$ is established. In the present example embodiment, the inner diameter $\phi 1$ of the inverter unit-side penetration hole 71 is slightly smaller than the inner diameter $\phi 2$ of the motor unit-side penetration hole 13d1.

<Pump Unit 40>

As illustrated in FIG. 1, the pump unit 40 is positioned on one side in the axial direction from the motor unit 10, specifically on the front side (negative Z side). The pump unit 40 is driven by the motor unit 10 with the shaft 11 therebetween. The pump unit 40 has a pump rotor 47 and a pump housing 51. The pump housing 51 has the pump body 52 and a pump cover 57. Hereinafter, each of the components will be described in detail.

(Pump Body 52)

The pump body 52 is fixed to the inside on the front side (negative Z side) of the motor housing 13 on the front side (negative Z side) of the motor unit 10. The pump body 52 has a recess portion 54 depressed to the front side (negative Z side) from a surface on the rear side (positive Z side). A seal member 59 is accommodated inside the recess portion 54. An annular recess portion 60 depressed inward in the radial direction is provided on an outer surface 52b of the pump body 52 on the rear side. A seal member 61 (for example, an O-ring) is inserted into this recess portion 60.

The pump body 52 has a penetration hole 55 penetrating the pump body 52 along the central axis J. Both ends of the penetration hole 55 in the axial direction open such that it is penetrated by the shaft 11. An opening on the rear side (positive Z side) opens in the recess portion 54, and an opening on the front side (negative Z side) opens at the front side end of the pump body 52. The penetration hole 55 functions as the slide bearing 45 which rotatably supports the shaft 11.

The pump-side flange portions 52a are provided in an end portion of the pump body 52 on the side outward in the radial direction. A plurality of pump-side flange portions 52a are provided at intervals in the circumferential direction.

(Pump Cover 57)

As illustrated in FIG. 1, the pump cover 57 has a pump cover main body portion 57a attached to the front side of the pump body 52, and a pump cover arm portion 57b extending from an end portion of the pump cover main body portion 57a on one side in the radial direction toward the motor unit 10 side. The pump cover main body portion 57a has an accommodation portion 53 accommodating the pump rotor 47 and having a side surface and a bottom surface positioned on the front side (negative Z side) of the motor unit 10. The accommodation portion 53 opens on the rear side (positive Z side) and is depressed to the front side (negative Z side). The shape of the accommodation portion 53 viewed in the axial direction is a circular shape.

The pump cover main body portion 57a covers the pump body 52 from the front side (negative Z side), such that the accommodation portion 53 is provided between the pump cover main body portion 57a and the pump body 52.

Pump cover-side flange portions 57a1 are provided in the end portion of the pump cover main body portion 57a on the side outward in the radial direction. A plurality of pump cover-side flange portions 57a1 are provided at intervals in the circumferential direction. Female screws in which the bolts 42 can be screwed are provided in the pump cover-side flange portions 57a1.

The motor-side flange portion 13c3 and the pump-side flange portion 52a are disposed on the pump cover-side flange portions 57a1 in an overlapping manner. When the bolts 42 penetrating the motor-side flange portion 13c3 and the pump-side flange portion 52a are fastened to the female screws provided in the pump cover-side flange portions 57a1, the motor unit 10 can be fixed to the pump unit 40.

The pump cover arm portion 57b extends to the rear side of the motor unit 10 from the outward end portion of the pump cover main body portion 57a on one side in the radial direction along the outer surface 13e of the motor housing 13. The pump cover arm portion 57b is formed to have a rectangular parallelepiped shape so that the rigidity thereof is reinforced. An end portion of the pump cover arm portion 57b on the rear side of the axis has the pump fixing portion 65 to be fixed. In the present example embodiment, the pump fixing portion 65 is fixed to a transmission, for example. The pump fixing portion 65 has a box shape and has the fixing hole portion 65a penetrating the pump fixing portion 65 in the Y axis direction. A fixing member such as a bolt is inserted into this fixing hole portion 65a, so that the pump fixing portion 65 is firmly fixed to a fixing target such as a transmission.

A fixing projection portion 67 protruding to the motor unit 10 side is provided in a rear side end portion of the pump fixing portion 65. A female screw portion is provided in a tip portion of the fixing projection portion 67 in the protruding direction. The motor fixing portion 15 is firmly fixed to the fixing projection portion 67 when the bolt 16 inserted into the hole portion 15b2 of the protrusion portion 15b is screwed into the female screw portion of the fixing projection portion 67.

In the first example embodiment described above, an example in which the accommodation portion 53 accommodating the pump rotor 47 is provided in the pump cover 57 has been described. However, the example embodiment is not limited thereto. The accommodation portion 53 may be provided in the pump body 52.

(Pump Rotor 47)

The pump rotor 47 is attached to the shaft 11. More specifically, the pump rotor 47 is attached to the front side (negative Z side) of the shaft 11. The pump rotor 47 has an inner rotor 47a attached to the shaft 11 and an outer rotor 47b surrounding the outward side of the inner rotor 47a in the radial direction. The inner rotor 47a has a toric shape. The inner rotor 47a is a gear having teeth on an outer surface in the radial direction.

The inner rotor 47a is fixed to the shaft 11. More specifically, an end portion of the shaft 11 on the front side (negative Z side) is press-fitted into the inward side of the inner rotor 47a. The inner rotor 47a rotates in a direction (θ direction) around the axis together with the shaft 11. The outer rotor 47b has a toric shape surrounding the outward side of the inner rotor 47a in the radial direction. The outer rotor 47b is a gear having teeth on an inner surface in the radial direction.

The inner rotor 47a and the outer rotor 47b mesh with each other, and the outer rotor 47b rotates when the inner rotor 47a rotates. That is, the pump rotor 47 rotates in accordance with rotation of the shaft 11. In other words, the motor unit 10 and the pump unit 40 have the same rotation axis. Accordingly, it is possible to curb increase in size of the electric oil pump 1 in the axial direction.

In addition, when the inner rotor 47a and the outer rotor 47b rotate, the volume between meshing parts of the inner rotor 47a and the outer rotor 47b changes. A region in which the volume decreases becomes a positive pressure region, and a region in which the volume increases becomes a negative pressure region. A suction port is disposed on the front side (negative Z side) of the pump rotor 47 in the negative pressure region. In addition, a discharge port is disposed on the front side (negative Z side) of the pump rotor 47 in the positive pressure region. Here, oil suctioned into the accommodation portion 53 from a suction opening 57c provided in the pump cover 57 is accommodated in a volume part between the inner rotor 47a and the outer rotor 47b and is sent to the positive pressure region. Thereafter, the oil is discharged from a discharge opening 57d provided in the pump cover 57 through the discharge port.

<Operations and Effects of Electric Oil Pump 1>

Next, operations and effects of the electric oil pump 1 will be described. As illustrated in FIG. 1, when the motor unit 10 of the electric oil pump 1 is driven, the shaft 11 of the motor unit 10 rotates, and the outer rotor 47b also rotates in accordance with rotation of the inner rotor 47a of the pump rotor 47. When the pump rotor 47 rotates, oil suctioned through the suction opening 57c of the pump unit 40 moves inside the accommodation portion 53 of the pump unit 40 and is discharged from the discharge opening 57d through the discharge port.

(1) Here, in the inverter unit 70 of the electric oil pump 1 according to the present example embodiment, the fixed portion 73b of the inverter housing 73 is fixed to the bottom portion 13d of the motor housing 13 with the fixing members 94 and the bolts 94a therebetween. Therefore, the inverter unit 70 can be firmly fixed to the motor unit 10. Therefore, when vibration generated from an engine or the like is transmitted to the motor fixing portion 15 via a fixing target (for example, a transmission) and is propagated to the motor housing 13, increase in vibration propagated to the inverter unit 70 can be curbed. In addition, since a plurality of bus bars 80 are disposed inside the circuit board accommodation portion 73a, the circuit board 75 and the connector-side terminals 77 can be electrically connected to each other without having complicated wirings for the coil ends 22b1. In addition, due to the bus bars 80 capable of effectively utilizing a space inside the circuit board accommodation portion 73a and the fixing members 94 disposed within the region 88 surrounded by the plurality of bus bars 80, the bus bars 80 and the fixing members 94 can be disposed compactly. Therefore, it is possible to realize miniaturization of the inverter unit 70.

(2) In addition, as illustrated in FIG. 3, the fixing members 94 are fixed to the bottom portion 13d of the motor housing 13 with metal collars 93 therebetween. The rigidity of a resin is lower than the rigidity of a metal. Therefore, when the inverter housing 73 is fixed to the motor housing 13 using the fixing members 94, if the fixing members 94 come into press contact with the resin inverter housing 73, there is a risk that the inverter housing 73 may be damaged. Here, the fixing members 94 are fixed to the bottom portion 13d of the motor housing 13 with the collars 93 therebetween, so that press contact forces of the fixing members 94 are transferred to the motor housing 13 with the collars 93 therebetween. Therefore, it is possible to prevent a risk that an excessive press contact force may act on the resin inverter housing 73.

(3) In addition, since the lengths L of the collars 93 in the axial direction are larger than the thickness W of the fixed portion 73b of the inverter housing 73 in the axial direction, when the inverter housing 73 is fixed to the motor housing 13 using the fixing members 94, a great part of press contact forces of the fixing members 94 can be transmitted to the collars 93. Therefore, it is possible to further reduce a risk that the resin fixed portion 73b may be damaged.

(4) In addition, as illustrated in FIG. 4, since the end portion of the protrusion portion 74 on one side in the axial direction protrudes from the opening portion of the insertion hole 13f on one side in the axial direction in a state where the protrusion portion 74 is inserted into the insertion hole 13f, the coil end 22b1 is protected by the protrusion portion 74 in a state where the coil end 22b1 penetrates the inside of the protrusion portion 74. Therefore, it is possible to prevent a risk that the coil end 22b1 may come into contact with the bottom portion 13d of the metal motor housing 13, so that it is possible to maintain insulation properties of the coil end 22b1.

(5) In addition, as illustrated in FIG. 2, since the fixing members 84 and the second penetration holes 74a are disposed alternately in the fixed portion 73b of the inverter housing 73, the fixing members 84 for fixing the inverter housing 73 to the motor housing 13 and the second penetration holes 74a which do not contribute to fixing can be disposed adjacent to each other. Therefore, it is possible to prevent a risk that a region in which the inverter housing 73 and the motor housing 13 are not fixed may expand.

(6) In addition, since the fixing members 84 and the second penetration holes 74a are disposed alternately in the circumferential direction with respect to the central axis J in the fixed portion 73b of the inverter housing 73, it is possible to narrow an unstable region in which the fixed portion 73b is not fixed, with respect to the circumferential direction of the fixed portion 73b, so that it is possible to realize more stable fixing of the inverter unit.

(7) In addition, as illustrated in FIG. 3, since the third penetration hole 78 penetrating the fixed portion 73b and the bottom portion 13d throughout the entireties thereof is provided in the fixed portion 73b and the bottom portion 13d, the inside of the motor unit 10 and the inside of the inverter unit 70 can communicate with each other through the third penetration hole 78. Therefore, it is possible to make air inside the motor unit 10 flow into the inverter unit 70.

(8) In addition, since the third penetration hole 78 is disposed on the side inward in the radial direction from the fixing members 94 and the second penetration holes 74a disposed in the circumferential direction, it is possible to effectively utilize the space within the region 88 surrounded by the plurality of bus bars 80, so that it is possible to realize miniaturization of the inverter unit 70.

(9) In addition, the inner diameter $\phi 1$ of the inverter unit-side penetration hole 71 is smaller than the inner diameter $\phi 2$ of the motor unit-side penetration hole 13d1. The fixed portion 73b is made of a resin, and the bottom portion 13d is made of a metal. Therefore, if the diameter of the inverter unit-side penetration hole 71 provided in the fixed portion 73b is increased, the rigidity of the fixed portion 73b is likely to deteriorate. On the other hand, since the bottom portion 13d of the motor housing 13 is made of a metal, it has a higher rigidity than the resin fixed portion 73b. Therefore, the inner diameter $\phi 1$ of the inverter unit-side penetration hole 71 is made smaller than the inner diameter $\phi 2$ of the motor unit-side penetration hole 13d1, so that it is possible to curb increase in risk that the fixed portion 73b may be damaged due to deterioration in rigidity of the fixed portion 73b.

Hereinabove, a preferable example embodiment of the present disclosure has been described. However, the present disclosure is not limited to the example embodiment, and various modifications and changes can be made within the range of the gist thereof. The example embodiment and modifications thereof are included in the scope of the disclosure and the gist and are simultaneously included in the disclosure disclosed in the claims and a range equivalent thereto.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric oil pump comprising:
    a motor including a shaft about a central axis extending in an axial direction;
    a pump on one side in the axial direction from the motor, and is driven by the motor with the shaft therebetween to discharge oil; and
    an inverter on the other side of the motor in the axial direction and is fixed to the motor; wherein
    the motor includes:
        a rotor fixed to the other side of the shaft in the axial direction;
        a stator positioned on a side outward in a radial direction from the rotor; and
        a motor housing to accommodate the rotor and the stator;
    the pump includes:
        a pump rotor attached to the shaft protruding from the motor to one side in the axial direction; and
        a pump housing including an accommodation portion accommodating the pump rotor;
    the inverter includes an inverter housing including a circuit board accommodation portion accommodating a circuit board;
    the inverter housing includes a plurality of bus bars that electrically connect coil ends disposed inside the circuit board accommodation portion and extending from the motor and the circuit board to each other;
    the motor housing includes a bottomed cylindrical shape including a bottom portion on the inverter side;
    an end portion of the inverter housing on the motor side includes a fixed portion that is fixed to the bottom portion of the motor housing;
    the fixed portion is fixed to the bottom portion of the motor housing with fixing members therebetween; and
    the fixing members are disposed within a region surrounded by the plurality of bus bars.

2. The electric oil pump according to claim 1, wherein
    the inverter housing is made of a resin;
    the motor housing is made of a metal;
    the fixed portion of the inverter housing includes first penetration holes that penetrate the fixed portion in the axial direction;
    metal collars are inserted into the first penetration holes; and
    the fixing members are fixed to the bottom portion of the motor housing with the collars therebetween.

3. The electric oil pump according to claim 2, wherein lengths of the collars in the axial direction are larger than a thickness of the fixed portion of the inverter housing in the axial direction.

4. The electric oil pump according to claim 1, wherein
    the fixed portion of the inverter housing includes a protrusion portion that protrude to the motor side;
    the protrusion portion includes a second penetration hole that penetrates the protrusion portion in the axial direction;
    the motor housing includes an insertion hole into which the protrusion portion is inserted in the bottom portion;
    an end portion of the protrusion portion on one side in the axial direction protrudes from an opening portion of the insertion hole on one side in the axial direction in a state where the protrusion portion is inserted into the insertion hole; and
    the coil end extending from the motor extends into the inverter through the second penetration hole.

5. The electric oil pump according to claim 4, wherein the fixing members and the second penetration holes are disposed alternately in a circumferential direction in the fixed portion of the inverter housing.

6. The electric oil pump according to claim 5, wherein the fixing members and the second penetration holes are disposed alternately in the circumferential direction with respect to the central axis in the fixed portion of the inverter housing.

7. The electric oil pump according to claim 4, wherein a third penetration hole penetrating the fixed portion and the bottom portion throughout the entireties thereof is provided in the fixed portion of the inverter housing and the bottom portion of the motor housing.

8. The electric oil pump according to claim 7, wherein the third penetration hole is disposed on a side inward in the radial direction from the fixing members and the second penetration holes disposed in the circumferential direction.

9. The electric oil pump according to claim 7, wherein
    the third penetration hole includes an inverter-side penetration hole in the fixed portion and a motor-side penetration hole in the bottom portion; and
    an inner diameter of the inverter-side penetration hole is smaller than an inner diameter of the motor-side penetration hole.

10. The electric oil pump according to claim 8, wherein
the third penetration hole includes an inverter-side penetration hole in the fixed portion and a motor-side penetration hole in the bottom portion; and an inner diameter of the inverter-side penetration hole is smaller than an inner diameter of the motor-side penetration hole.

* * * * *